United States Patent
Osawa et al.

(10) Patent No.: US 6,512,041 B2
(45) Date of Patent: Jan. 28, 2003

(54) FLUORORUBBER COMPOSITIONS AND METHOD OF MAKING

(75) Inventors: Yasuhisa Osawa, Usui-gun (JP); Shinichi Sato, Usui-gun (JP); Takashi Matsuda, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/929,083

(22) Filed: Aug. 15, 2001

(65) Prior Publication Data

US 2002/0028902 A1 Mar. 7, 2002

Related U.S. Application Data

(62) Division of application No. 09/336,716, filed on Jun. 21, 1999, now Pat. No. 6,297,339.

(30) Foreign Application Priority Data

Jun. 22, 1998 (JP) ............................................ 10-191038

(51) Int. Cl.[7] ......................... C08K 9/06; C08L 101/02; C08L 83/05
(52) U.S. Cl. ........................ 524/544; 524/545; 524/546; 525/104; 525/326.2; 525/342; 528/26; 528/28; 528/31; 528/32; 528/34; 528/36; 528/42
(58) Field of Search ................................ 524/544, 545, 524/546; 525/104, 326.2, 342; 528/31, 32, 34, 36, 26, 28, 42

(56) References Cited

U.S. PATENT DOCUMENTS

| 4,877,820 | A |   | 10/1989 | Cowan |
| 5,312,860 | A |   | 5/1994 | Mize et al. |
| 5,312,885 | A |   | 5/1994 | Takago et al. |
| 5,380,811 | A |   | 1/1995 | Kishita et al. |
| 5,416,183 | A |   | 5/1995 | Sato et al. |
| 5,656,711 | A |   | 8/1997 | Fukuda et al. |
| 6,127,504 | A |   | 10/2000 | Fukuda et al. |
| 6,160,074 | A | * | 12/2000 | Matsuda et al. ............ 525/104 |
| 2001/0008914 | A1 | * | 7/2001 | Osawa et al. ............... 524/188 |

FOREIGN PATENT DOCUMENTS

| EP | 351797 | 1/1990 |
| EP | 765913 | 4/1997 |
| EP | 811651 | 10/1997 |

* cited by examiner

*Primary Examiner*—D. R. Wilson
(74) *Attorney, Agent, or Firm*—Millen, White, Zelano & Branigan

(57) ABSTRACT

A crosslinkable fluororubber composition comprising (A) a polymer comprising a perfluoro compound having at least two alkenyl groups and a divalent perfluoroalkylene or perfluoropolyether structure a compound having at least two hydrosilyl groups, the hydrosilyl-bearing compound being added to some of the alkenyl groups in the perfluoro compound, (B) a reinforcing filler, and (C) a crosslinking agent having a hydrosilyl group and capable of addition reaction or a peroxide crosslinking agent, and (D) a surface treating agent having at least one fluoroalkenyl group and silanol group in the molecule, is roll millable and compression moldable. It cures into products having satisfactory solvent resistance, chemical resistance, heat resistance, and low-temperature properties.

7 Claims, No Drawings

FLUORORUBBER COMPOSITIONS AND METHOD OF MAKING

This is a division of application Ser. No. 09/336,716, filed Jun. 21, 1999, now U.S. Pat. No. 6,297,339.

This invention relates to fluororubber compositions which can be effectively roll-milled and cure into products having excellent mechanical properties as well as satisfactory solvent resistance, chemical resistance, heat resistance, and low-temperature properties, and a method for preparing the same.

BACKGROUND OF THE INVENTION

Prior art vinylidene fluoride base fluororubbers are used in a variety of applications mainly in the automobile and mechanical industries since they produce elastomers having good heat resistance and mechanical strength.

These fluororubbers, however, are not satisfactory in chemical resistance. They are readily swollen in polar solvents such as ketone, lower alcohol, carbonyl and organic acid solvents. They are deteriorated by amine-containing chemicals so that their rubber strength and elongation may substantially decline. With respect to low-temperature properties, the fluororubbers lose rubber elasticity at temperatures below −20° C. to such an extent that they cannot be used as sealants. This generally imposes a limit on the use of fluororubbers in cold areas.

In order to eliminate these drawbacks, curable fluorine-containing compositions comprising a perfluoro compound and a fluorinated organohydrogenpolysiloxane as main components were proposed. These compositions, however, are liquid because they are based on liquid perfluoro compounds having a low degree of polymerization. Then the compositions are suitable in the FIPG process and LIMS molding, but less effective in compression molding conventionally employed for rubber molding.

In particular, the curable fluorine-containing compositions often prohibit the use of conventional two-plate molds for rubber because of the difficulty of molding and the frequent occurrence of defects by air entrainment. Steady production is difficult unless a special LIMS mold is newly fabricated. The LIMS mold, however, has the problems that it is generally more expensive than the conventional two-plate molds for rubber, the mounting of the mold in a LIMS molding machine is cumbersome, and the molding machine requires time-consuming adjustment after mold mounting. The LIMS mold does not lend itself to the manufacture of a variety of parts in small quantities.

SUMMARY OF THE INVENTION

Therefore, an object of the invention is to provide a fluororubber composition which can be effectively roll milled and compression molded, and cure into products having satisfactory solvent resistance, chemical resistance, heat resistance, and low-temperature properties. Another object is to provide a method for preparing the same.

We have found that using a polymer comprising a perfluoro compound having at least two alkenyl groups in the molecule and a divalent perfluoroalkylene or divalent perfluoropolyether structure in the backbone, with a compound having at least two hydrosilyl groups in the molecule and capable of addition reaction with alkenyl groups being added to some of the alkenyl groups in the perfluoro compound, there is obtained a rubber composition which can be roll milled (that is, millable rubber) and compression molded.

With prior art synthetic techniques, it was difficult to increase the molecular weight of a liquid perfluoro compound to the extent enabling roll milling. By addition reacting a hydrosilyl-bearing compound with some alkenyl groups in the liquid perfluoro compound to induce crosslinking, the perfluoro compound can be increased in molecular weight and converted into a non-flowing gel-like polymer (this is referred to as precure). When a reinforcing filler is further blended in the gel-like polymer, the resulting mixture can be compounded by a two-roll rubber mill. That is, a millable type fluororubber composition is obtained which can be worked by a rubber mill and molded in a mold for compression molding. Additionally, this composition cures into products having satisfactory solvent resistance, chemical resistance, heat resistance, and low-temperature properties.

While the fluororubber composition is millable and compression moldable, it can also be extrusion molded and calendered. Using a twin-roll rubber mill, a crosslinking agent can be added to the fluororubber composition before molding. Since accurate sheeting of the composition is possible, the loss of material is reduced and conventional two-plate molds for rubber are applicable.

Further, when a compound having at least one fluoroalkyl group and silanol groups in the molecule is blended as a surface treating agent for the filler, the filler becomes more dispersible and thus easy to blend whereby the rubber is improved in mechanical properties, especially tensile strength. More particularly, if the filler is blended with the polymer in the absence of the surface treating agent, there is a risk that the addition of the filler would become a cumbersome operation, the dispersion of the filler would become insufficient, and the less interaction between the polymer and the filler would make it difficult to achieve excellent rubber physical. properties including a tensile strength of more than 100 kg/cm$^2$. When the filler is blended with the polymer along with the surface treating agent, the filler can be readily blended to form a fluororubber composition of the millable type which provides excellent rubber physical properties including a high tensile strength.

Accordingly, the present invention provides a crosslinkable fluororubber composition comprising (A) 100 parts by weight of a polymer comprising a perfluoro compound having at least two alkenyl groups in the molecule and a divalent perfluoroalkylene or divalent perfluoropolyether structure in the backbone and a compound having at least two hydrosilyl groups in the molecule and capable of addition reaction with alkenyl groups, the hydrosilyl-bearing compound being added to some of the alkenyl groups in the perfluoro compound, (B) 1 to 100 parts by weight of a reinforcing filler, and (C) a sufficient amount to cure component (A) of a crosslinking agent having a hydrosilyl group in the molecule and capable of addition reaction or a peroxide crosslinking agent.

In another aspect, the invention provides a method for preparing a fluororubber composition comprising the steps of:

(a) adding a compound having art least two hydrosilyl groups in the molecule and capable of addition reaction with alkenyl groups to a perfluoro compound having at least two alkenyl groups in the molecule and a divalent perfluoroalkylene or divalent perfluoropolyether structure in the backbone in such amounts that the molar ratio of hydrosilyl groups in said hydrosilyl-containing compound to alkenyl groups in said perfluoro compound may range from 0.1/1 to 0.99/1, and effecting addition reaction to form a polymer, (b) adding a reinforcing filler to the polymer of step (a) in an amount of 1 to 100 parts by weight per 100 parts by weight of said perfluoro compound, to form a base compound, and (c) adding to the base compound of step (b), a crosslinking agent having a hydrosilyl group in the molecule and capable of addition reaction or a peroxide crosslinking agent in a sufficient amount to react with alkenyl groups in the polymer.

DETAILED DESCRIPTION OF THE INVENTION

Component (A)

Component (A) of the crosslinkable fluororubber composition is a polymer comprising (I) a perfluoro compound having at least two alkenyl groups in the molecule and a divalent perfluoroalkylene or divalent perfluoropolyether structure in the backbone and (II) a compound having at least two hydrosilyl groups in the molecule and capable of addition reaction with alkenyl groups wherein the hydrosilyl-bearing compound is added to some of the alkenyl groups in the perfluoro compound.

The perfluoro compound as component (I) is technically difficult to synthesize into a high molecular weight polymer as typified by a resin or rubber. The perfluoro compound should have at least two alkenyl groups in the molecule and a divalent perfluoroalkylene or divalent perfluoropolyether structure in the backbone. It is preferably a linear perfluoro compound having a viscosity of about 25 to about 1,000,000 centistokes at 25° C.

The perfluoro compound is typically of the following general formula (1).

$$CH_2=CH-(X)_p-(Rf-Q)_a-Rf-(X)_p-CH=CH_2 \quad (1)$$

Herein, X is independently —$CH_2$—, —$CH_2O$—, —$CH_2OCH_2$—, —Y—$NR^1$—$SO_2$— or —Y—$NR^1$—CO— wherein Y is —$CH_2$— or $$-\underset{\underset{CH_3}{|}}{\overset{\overset{CH_3}{|}}{Si}}-\!\!\!\bigcirc\!\!\!\!-,$$

and $R^1$ is hydrogen or a substituted or unsubstituted monovalent hydrocarbon group. Rf is a divalent perfluoroalkylene group or divalent perfluoropolyether group. Letter p is independently equal to 0 or 1, and a is an integer inclusive of 0.

Q is a group of the following general formula (2), (3) or (4).

$$\overset{O}{\underset{\|}{-C}}-\overset{R^1}{\underset{|}{N}}-R^3-\overset{R^1}{\underset{|}{N}}-\overset{O}{\underset{\|}{C}}- \quad (2)$$

$$-(X)_p-CH_2CH_2R^4CH_2CH_2-(X)_p- \quad (3)$$

$$\overset{O}{\underset{\|}{-C}}-N\underset{\underset{R^3}{\rule{0.8cm}{0.4pt}}}{\overset{\overset{R^3}{\rule{0.8cm}{0.4pt}}}{\rule{0pt}{0.4pt}}}N-\overset{O}{\underset{\|}{C}}- \quad (4)$$

X, p, and $R^1$ are as defined above; $R^3$ is a substituted or unsubstituted divalent hydrocarbon group; and $R^4$ is a substituted or unsubstituted divalent hydrocarbon group which may be separated by at least one intervening atom selected from oxygen, nitrogen, silicon and sulfur atoms, or a group of the following general formula (5) or (6).

$$-\underset{\underset{R^5}{|}}{\overset{\overset{R^5}{|}}{Si}}-R^6-\underset{\underset{R^5}{|}}{\overset{\overset{R^5}{|}}{Si}}- \quad (5)$$

$$-\underset{\underset{R^6}{\diagdown}}{\overset{\overset{R^6}{|}}{Si}}\underset{R^6}{\overset{R^6}{\diagup}}\underset{\underset{}{|}}{\overset{\overset{R^5}{|}}{Si}}- \quad (6)$$

$R^5$ is a substituted or unsubstituted monovalent hydrocarbon group and $R^6$ is a group containing in its backbone structure at least one atom selected from carbon, oxygen, nitrogen, silicon and sulfur atoms.

Specifically, Rf is a divalent perfluoroalkylene group or divalent perfluoropolyether group. The divalent perfluoroalkylene group is preferably represented by the formula: —$C_mF_{2m}$— wherein m is from 1 to 10, preferably 2 to 6. The divalent perfluoropolyether group is preferably represented by the formula:

$$-(\underset{\underset{X}{|}}{CFOCF_2})_p-(CF_2)_r-(CF_2O\underset{\underset{X}{|}}{CF})_q-$$

wherein X is F or $CF_3$, p, q and r are integers satisfying $p \geq 1$, $q \geq 1$, $2 \leq p+q \leq 200$, especially $2 \leq p+q \leq 110$, and $0 \leq r \leq 6$, $$-CF_2CF_2OCF_2-(\underset{\underset{CF_3}{|}}{CFOCF_2})_s-(CF_2)_r-(CF_2O\underset{\underset{CF_3}{|}}{CF})_t-CF_2OCF_2CF_2-$$

wherein r, s and t are integers satisfying $0 \leq r \leq 6$, $s \geq 0$, $t \geq 0$, $0 \leq s+t \leq 200$, especially $2 \leq s+t \leq 110$, $$-\underset{\underset{X}{|}}{CF}-(OCFCF_2)_u-(OCF_2)_v-O\underset{\underset{X}{|}}{CF}-$$

wherein X is F or $CF_3$, u is an integer of 1 to 100 and v is an integer of 1 to 50, or $$-CF_2CF_2-(OCF_2CF_2CF_2)_w-OCF_2CF_2-$$

wherein w is an integer of 1 to 100.

Illustrative examples of Rf are given below.

$$-C_4F_8-, \quad -C_6F_{12}-,$$

$$-(\underset{\underset{CF_3}{|}}{CFOCF_2})_n(CF_2O\underset{\underset{CF_3}{|}}{CF})_{\overline{m}}- \quad \overline{n+m}=2-200,$$

$-CF_2CF_2OCF_2(CF_2)_2CF_2OCF_2CF_2-$, $-CF_2CF_2OCF_2CFOCF_2(CF_2)_2CF_2OCFCF_2OCF_2CF_2-$,
              $|$                          $|$
              $CF_3$                       $CF_3$ $-CF_2(OCF_2CF_2)_n(OCF_2)_mOCF_2-$    $\overline{n} = 5-100$, $\overline{m} = 1-100$, $-CF(OCFCF_2)_n(OCF_2)_mOCF-$    $\overline{n} = 5-100$, $\overline{m} = 1-100$,
 $|$  $|$              $|$
 $CF_3$ $CF_3$          $CF_3$ $-CF_2CF_2(OCF_2CF_2CF_2)_nOCF_2CF_2-$    $\overline{n} = 5-100$ Q is a group of the following general formula (2) (3) or (4).

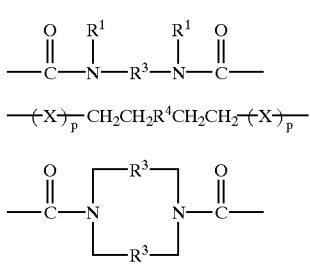

(2)

(3)

$-(X)_p-CH_2CH_2R^4CH_2CH_2-(X)_p-$ (4)

$R^1$ is hydrogen or a substituted or unsubstituted monovalent hydrocarbon group. The substituted or unsubstituted monovalent hydrocarbon groups are preferably those of 1 to 12 carbon atoms, for example, alkyl groups such as methyl, ethyl, propyl, isopropyl, butyl, isobutyl, tert-butyl, pentyl, neopentyl, hexyl, heptyl, octyl, nonyl and decyl; cycloalkyl groups such as cyclopentyl, cyclohexyl, and cycloheptyl; aryl groups such as phenyl, tolyl, xylyl and naphthyl; aralkyl groups such as benzyl, phenylethyl and phenylpropyl; and substituted ones of these groups in which some or all of the hydrogen atoms are replaced by halogen atoms such as fluoro, chloro and bromo, for example, chloromethyl, bromoethyl, chloropropyl, trifluoropropyl, and 3,3,4,4,5,5,6,6,6-nonafluorohexyl.

$R^3$ is a substituted or unsubstituted divalent hydrocarbon group. The substituted or unsubstituted divalent hydrocarbon groups are preferably those of 1 to 10 carbon atoms, more preferably 2 to 6 carbon atoms. Examples include alkylene groups such as methylene, ethylene, propylene, methylethylene, butylene, and hexamethylene; cycloalkylene groups such as cyclohexylene; arylene groups such as phenylene, tolylene, xylylene, naphthylene, and biphenylene; and substituted ones of these groups in which some of the hydrogen atoms are replaced by halogen atoms. It is noted that in formula (4), two $R^3$ groups may be identical or different.

$R^4$ is a substituted or unsubstituted divalent hydrocarbon group which may be separated by at least one intervening atom selected from oxygen, nitrogen, silicon and sulfur atoms. Alternatively, $R^4$ is a group of the following general formula (5) or (6):

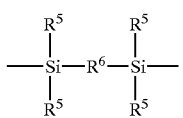

(5)

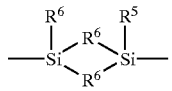

(6)

wherein $R^5$ is a substituted or unsubstituted monovalent hydrocarbon group and $R^6$ is a group containing in its backbone structure at least one atom selected from carbon, oxygen, nitrogen, silicon and sulfur atoms.

In formulae (5) and (6) representing the groups of $R^4$, the monovalent hydrocarbon groups represented by $R^5$ are the same as the substituted or unsubstituted monovalent hydrocarbon groups described for $R^1$. Exemplary groups represented by $R^6$ are substituted or unsubstituted divalent hydrocarbon groups, preferably of 1 to 20 carbon atoms, more preferably 1 to 10 carbon atoms, for example, alkylene groups such as methylene, ethylene, propylene, methylethylene, butylene, and hexamethylene, cycloalkylene groups such as cyclohexylene, arylene groups such as phenylene, tolylene, xylylene, naphthylene, and biphenylene, substituted ones of these groups in which some of the hydrogen atoms are replaced by halogen atoms, etc., and mixtures of these substituted or unsubstituted alkylene and arylene groups.

Other examples of the groups represented by $R^6$ are divalent groups containing one or more oxygen, nitrogen, silicon and sulfur atoms in its backbone structure. In the divalent groups, the oxygen atom may intervene in the form of —O—, the sulfur atom may intervene in the form of —S—, and the nitrogen atom may intervene in the form of —NR— wherein R is hydrogen, alkyl of 1 to 8 carbon atoms, preferably 1 to 6 carbon atoms, or aryl. The silicon atom may intervene in the form of an organosiloxane-containing group or organosilylene group. Illustrative examples are given below.

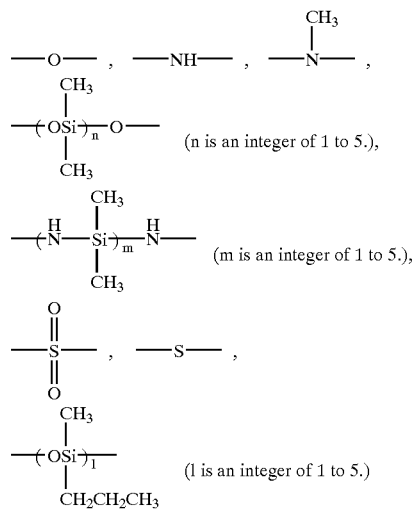

On the other hand, the substituted or unsubstituted divalent hydrocarbon groups represented by $R^4$, which may be separated by at least one atom selected from oxygen, nitrogen, silicon and sulfur atoms, include the substituted or unsubstituted divalent hydrocarbon groups described for $R^6$ and those of the same groups in each of which an oxygen, nitrogen, silicon and/or sulfur atom intervenes midway.

In formula (1), the Q groups represented by formulae (2), (3) and (4) are exemplified by the following groups. Note that in the following formulae, Me is methyl, Ph is phenyl, and R is hydrogen, methyl or phenyl.

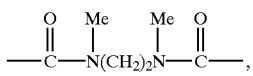
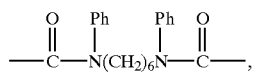
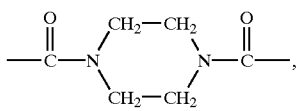
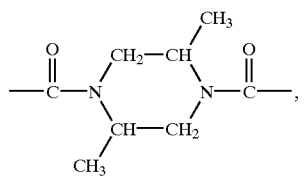
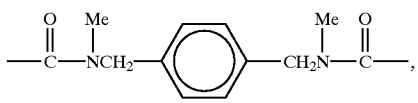
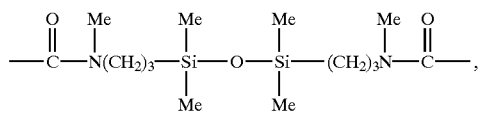
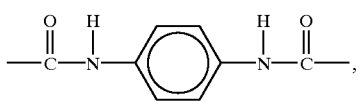
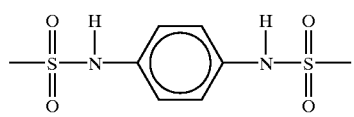
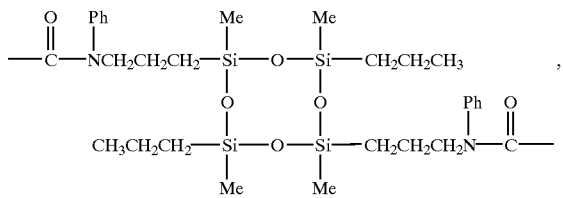
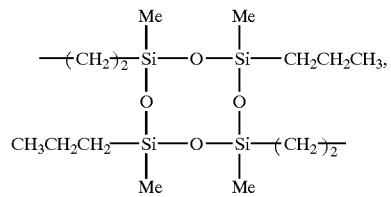
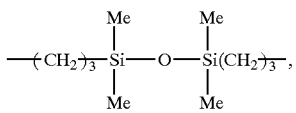
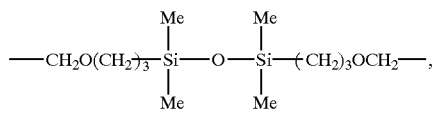
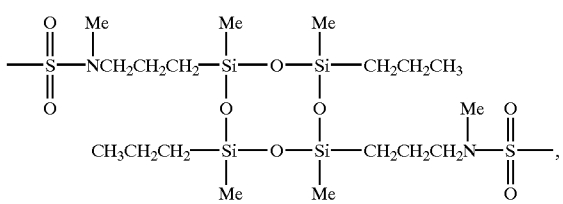
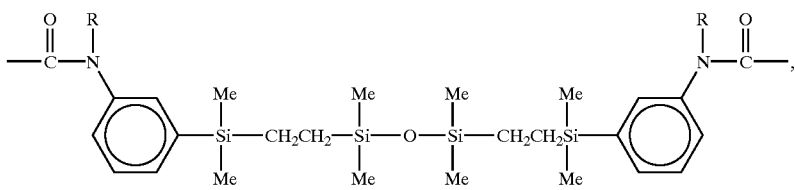
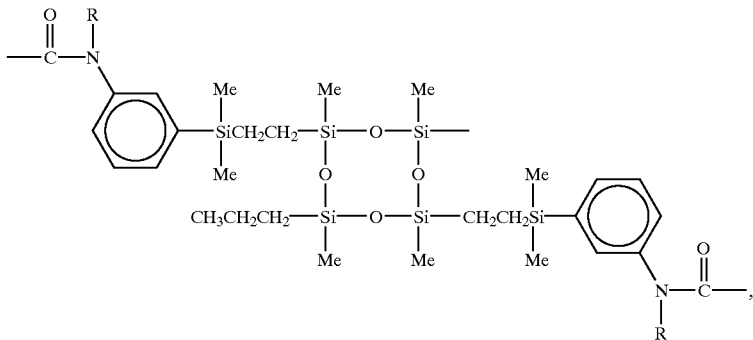

-continued

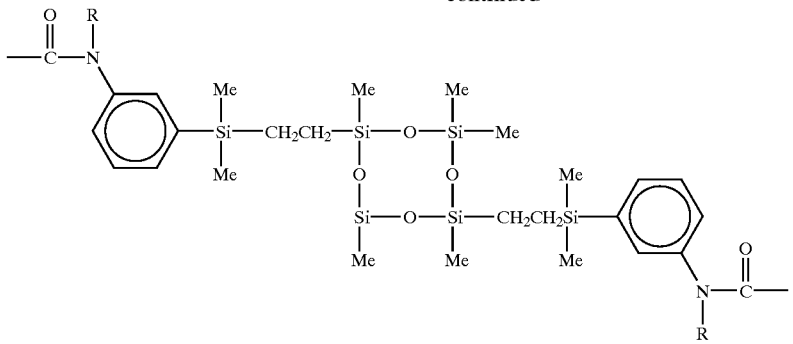

In formula (1), a is an integer inclusive of 0. Therefore, the fluorinated compound of formula (1) contains at least one divalent perfluoroalkylene or divalent perfluoropolyether group in one molecule. Preferably, a is an integer of 0 to 10, especially 0 to 6.

X is independently selected from among —CH$_2$—, —CH$_2$—, —CH$_2$OCH$_2$—, —Y—NR$^1$—SO$_2$—, and —Y—NR$^1$—CO— wherein Y is —CH$_2$— or

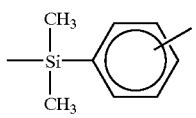

(inclusive of ortho, meta and para-positions), and R$^1$ is hydrogen or a substituted or unsubstituted monovalent hydrocarbon group. It is understood that R$^1$ is as defined previously, and preferably methyl, phenyl or allyl.

Letter p is equal to 0 or 1. The perfluoro compound of formula (1) has a vinyl, allyl or analogous group at either end.

The linear perfluoro compound as component (I) should preferably have a viscosity of about 25 to about 1,000,000 centistokes at 25° C., more preferably about 100 to about 60,000 centistokes at 25° C. At a viscosity outside the range, there would arise inconvenient problems including difficulty to form a cured rubber product having the desired properties and poor workability.

Next, component (II) is described. It is a compound having at least two hydrosilyl groups in the molecule and capable of addition reaction with alkenyl groups. Included are organic compounds containing hydrosilyl groups and organic silicon compounds containing hydrosilyl groups. When dispersibility and heat resistance are taken into account, compounds of the following formulae (7) and (8) are preferred.

Z—CH$_2$CH$_2$—(X)$_p$—Rf—(X)$_p$—CH$_2$CH$_2$—Z  (7)

Rf—(X)$_p$—CH$_2$CH$_2$—Z  (8)

In the formulae (7) and (8), X, p, and Rf are as defined above. Z is a group of the following general formula (9):

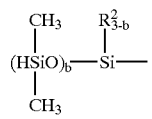 (9)

wherein R$^2$ is a substituted or unsubstituted monovalent hydrocarbon group and b is equal to 1, 2 or 3 for the compound of formula (7) and equal to 2 or 3 for the compound of formula (8).

Specifically, X is independently selected from among —CH$_2$—, —CH$_2$O—, —CH$_2$OCH$_2$—, —Y—NR$^1$—SO$_2$—, and —Y—NR$^1$—CO— wherein Y is —CH$_2$— or

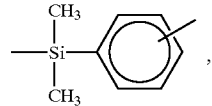

and R$^1$ is hydrogen or a substituted or unsubstituted monovalent hydrocarbon group; Rf is a divalent perfluoroalkylene or divalent perfluoropolyether group; and p is independently equal to 0 or 1.

Illustrative examples of X, Rf and p are as described above. Rf, X and p in formula (7) or (8) may be identical with or different from Rf, X and p in formula (1), respectively.

Z is a group of formula (9).

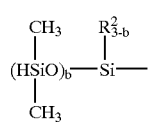 (9)

Herein, R$^2$ is a substituted or unsubstituted monovalent hydrocarbon group. The substituted or unsubstituted monovalent hydrocarbon groups are preferably those of 1 to 8 carbon atoms, for example, alkyl groups such as methyl, ethyl, propyl, isopropyl, butyl, isobutyl, tert-butyl, pentyl, neopentyl, hexyl, heptyl, and octyl; cycloalkyl groups such as cyclopentyl, cyclohexyl, and cycloheptyl; aryl groups such as phenyl, tolyl, and xylyl; aralkyl groups such as benzyl and phenylethyl; and substituted ones of these groups in which some or all of the hydrogen atoms are replaced by halogen atoms such as fluoro, chloro and bromo or the like, for example, chloromethyl, bromoethyl, chloropropyl, trifluoropropyl, and 3,3,4,4,5,5,6,6,6-nonafluorohexyl.

Letter b is equal to 1, 2 or 3 for the compound of formula (7) and equal to 2 or 3 for the compound of formula (8).

The polymer as component (A) is obtained by effecting addition reaction of hydrosilyl groups in component (II) to some of the alkenyl groups in component (I). The remaining alkenyl groups in component (I) are left in the polymer. This polymer is a non-flowing gel-like polymer.

Components (I) and (II) are preferably used in such amounts that the molar ratio of hydrosilyl groups in component (II) to alkenyl groups in component (I) may range from 0.1/1 to 0.99/1, especially from 0.3/1 to 0.8/1. With a ratio of less than 0.1, the perfluoro compound would not be gelled, but somewhat thickened so that even after addition of a filler, the resulting compound may be a liquid rubber which is difficult to sheet by means of a two-roll rubber mill. With a ratio in excess of 0.99, the resulting polymer would become cured rubber to which a filler is added with difficulty or which cannot be worked on rolls.

For the addition reaction of component (II) to component (I), it is recommended to use an addition reaction catalyst. Preferred catalysts are platinum group metal compounds. The platinum group metal compounds used herein are generally compounds of noble metals which are expensive. For ease of availability, platinum compounds are often employed. Examples of the platinum compounds include chloroplatinic acid, complexes of chloroplatinic acid with olefins (e.g., ethylene), complexes of chloroplatinic acid with alcohols or vinylsiloxanes, and platinumon silica, alumina or carbon, though not limited thereto. Known as platinum group metal compounds other than the platinum compounds are compounds of rhodium, ruthenium, iridium and palladium, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The amount of the catalyst used is not critical and the desirable curing rate will be achieved with a catalytic amount. From the economical aspect or in order to obtain favorable cured products, an appropriate amount of the catalyst is about 0.1 to about 1,000 ppm, more preferably about 0.1 to about 500 ppm of platinum group metal based on the weight of components (I) and (II) combined.

The conditions for the addition reaction may be determined as appropriate. Reaction may be carried out at room temperature although it is accelerated by heating at about 50 to 200° C.

Component (B)

Component (B) of the fluororubber composition according to the invention is a reinforcing filler. The reinforcing filler is generally added for the purposes of improving roll workability, mechanical strength, thermal stability, weather resistance, chemical resistance and flame retardance, reducing thermal shrinkage upon curing, and/or reducing the coefficient of thermal expansion and gas permeability of an elastomer as cured. The filler is mainly added for the purpose of improving roll workability and mechanical strength in order to provide a rubber composition of the millable type.

The fillers include fumed silica, colloidal silica, diatomaceous earth, quartz flour, glass fibers, and carbon as well as metal oxides such as iron oxide, titanium oxide and cerium oxide and metal carbonates such as calcium carbonate and magnesium carbonate. The fillers may have been treated with various surface treating agents. Among others, fumed silica is preferred for mechanical strength. Fumed silica treated with a surface treating agent in the form of a compound containing silicon in a molecule such as a silane is especially preferred because it is readily dispersible.

The amount of the reinforcing filler blended is 1 to 100 parts by weight per 100 parts by weight of the polymer. Less than 1 part of the filler is insufficient to provide reinforcement and improve roll workability whereas more than 100 parts of the filler detracts from rubber flexibility and prevents the rubber from being wrapped on rolls.

In one preferred embodiment of the invention, a surface treating agent in the form of a compound having at least one fluoroalkyl group and silanol groups in the molecule is blended as component (D). The fluoroalkyl group is preferably selected from alkyl groups of 1 to 20 carbon atoms, especially 1 to 10 carbon atoms, in which some or all of the hydrogen atoms on the alkyl group are replaced by fluorine atoms, and the compound is preferably selected from silanes and siloxanes of 1 to 20 silicon atoms, more preferably 1 to 5 silicon atoms. Differently stated, the surface treating agent (D) may be a compound having affinity to perfluoro groups in the polymer and silanol groups left on the filler surface. If a compound has at least one fluoroalkyl group and silanol groups in the molecule, it acts on both the polymer and the filler so that it may serve as the surface treating agent.

Illustratively, compounds of the following formulae (10), (11) and (12) are preferably used as the surface treating agent (D).

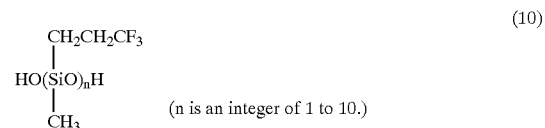

(n is an integer of 1 to 10.)

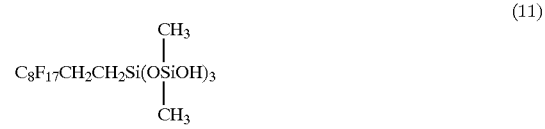

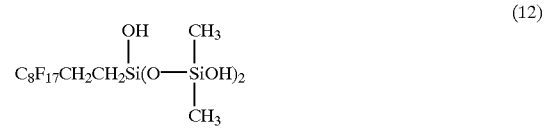

An appropriate amount of the surface treating agent blended is 0.01 to 30 parts by weight per 100 parts by weight of the polymer (A). Less than 0.01 part of the agent achieves ineffective surface treatment so that little improvements in filler/rubber blending (or working) and rubber physical properties are expectable. More than 30 parts of the agent facilitates filler/rubber blending (or working), but sticks to the roll surface after blending of a crosslinking agent or during sheeting operation, exacerbating roll workability. In addition, such an excess of the surface treating agent becomes an impurity causing to detract from rubber physical properties. The preferred amount is 0.1 to 20 parts by weight.

Component (C)

Component (C) is a crosslinking agent which is (C-1) a crosslinking agent having a hydrosilyl group in a molecule and capable of addition reaction or (C-2) a peroxide crosslinking agent.

The crosslinking agent (C-1) is typically a organohydrogenpolysiloxane having at least two, preferably at least three, hydrosilyl groups in a molecule. Such organohydrogenpolysiloxanes may be those commonly used in silicone rubber compositions of the addition reaction curing type. In particular, those siloxanes described above as component (II) can be used.

The amount of crosslinking agent (C-1) added is sufficient to react with residual alkenyl groups in component (A) for thereby curing component (A). From the standpoint of the shelf stability of rubber compositions, like prior artmillable rubber compositions, the crosslinking agent is desirably added to the polymer composition immediately before rubber molding. It is important for stabilizing rubber physical properties to determine the amount of the crosslinking agent added by taking into account the type and amount of the crosslinking compound used as component (II) in Component (A). Specifically, the crosslinking agent is preferably added in such an amount that the ratio of {hydrosilyl groups in component (II) plus hydrosilyl groups in component (C)}/{alkenyl groups in component (I)} may range from 0.5 to 5, especially from 0.8 to 2.

In crosslinking agent (C-1), an addition reaction catalyst such as a platinum group metal compound maybe blended if desired. If the addition reaction catalyst used in the preparation of component (A) is left in component (A), the catalyst need not necessarily be added. The catalyst, if added, is used in a catalytic amount which is as described above.

The other component (C-2) is a peroxide crosslinking agent. Examples of this crosslinking agent include dibenzoyl peroxide, dicumyl peroxide, di-t-butyl peroxide, t-butylperoxyacetate, t-butylperoxybenzoate, and 2,5-dimethyl-2,5-di-t-butylperoxyhexane, with the 2,5-dimethyl-2,5-di-t-butylperoxyhexane being preferred from the standpoints of shelf stability and scorch prevention.

The peroxide crosslinking agent is added in a sufficient amount to cure component (A), preferably 0.1 to 5 parts by weight, more preferably 0.5 to 3 parts by weight per 100 parts by weight of component (A). Less than 0.1 part of the peroxide crosslinking agent would induce insufficient or slow crosslinking whereas more than 5 parts would adversely affect the physical properties of rubber.

In the composition, various additives may be added for the purpose of enhancing its practical utility, if necessary. Such additives include, for example, polysiloxanes containing $CH_2=CH(R)SiO$ units wherein R is hydrogen or a substituted or unsubstituted monovalent hydrocarbon group (see JP-B 48-10947) and acetylene compounds (see U.S. Pat. No. 3,445,420 and JP-B 54-3774), both added for controlling the curing rate of the composition, and ionic compounds of heavy metals (see U.S. Pat. No. 3,532,649).

The fluororubber composition of the invention is prepared by a method including the steps of:

(a) forming a polymer as component (A), (b) adding a filler as component (B) and optionally a surface treating agent as component (D), and (c) adding a crosslinking agent as component (C).

Step (a) is to increase the molecular weight of a liquid perfluoro compound, which is otherwise difficult to increase its molecular weight to a roll workable level, by crosslinking some of the reactive groups thereon with hydrosilyl groups. Step (a) is thus referred to as precure step. This step enables subsequent blending of a filler on a twin-roll rubber mill. If the molecular weight is not increased by this step, there results a liquid or paste composition similar to prior art liquid rubbers, which is difficult to blend or sheet on a roll rubber mill.

Since step (a) is mixing of liquids, a beaker level of agitation is acceptable and relatively simple mixing machines may be used. Satisfactory mixing can be carried out with commercially available liquid mixing machines. Mixing in a rubber blending apparatus to be used in the subsequent step of filler blending is convenient because there is no need to transfer the composition. It is thus recommended to carry out mixing in rubber kneading machines such as rubber kneaders, pressure kneaders and Banbury mixers to be used in blending step (b).

Step (b) is to add a filler as component (B) for adjusting hardness, rubber strength and roll workability and optionally, a surface treating agent as component (D) for facilitating blending of the filler and improving rubber physical properties. The composition resulting from step (b) takes the same form as prior art millable type rubber compositions. Especially, by virtue of component (D) blended, the composition becomes shelf stable and roll workable.

As mentioned above, step (b) may use rubber kneaders, pressure kneaders and Banbury mixers as commonly used in blending of conventional rubbers.

This blending may be carried out at room temperature. If appropriate for the purpose of stabilizing shearing heat, heating may be done within the temperature range not causing decomposition of the polymer. Heating at about 100 to 300° C. for about 10 minutes to about 8 hours is desirable.

Step (c) is to blend a crosslinking agent as component (C) and optionally, a catalyst, crosslinking aid and other additives. As the apparatus used in step (c), rubber kneaders, pressure kneaders and Banbury mixers are undesirable because of the risk of a scorching phenomenon that the heat generated by mixing drives crosslinking. Desirable are twin-roll rubber mills also capable of sheeting operation, especially equipped with cooling means for suppressing crosslinking from being driven by the heat generating during milling.

In curing the composition of the invention, preferred conditions for primary curing include a temperature of about 100 to 200° C. and a time of about 1 to 30 minutes. Temperatures below 100IC take a longer curing time, which is undesirable for commercial production. Temperatures above 200° C. have the risk of scorching. The preferred temperature is in the range of about 100 to 200° C. and more preferably about 120 to 170° C. The curing time at such temperatures may be selected as appropriate to ensure that the crosslinking reaction is completed. In order to stabilize the physical properties of the inventive composition, secondary curing is preferably carried out at a temperature of about 100 to 230° C. for a time of about 1 to 24 hours. Secondary curing at temperatures below 100° C. is ineffective whereas temperatures above 230° C. can cause pyrolysis. More preferably, secondary curing is carried out at about 150 to 200° C. for about 1 to 20 hours.

There has been described a fluororubber composition comprising components (A), (B) and (C) in admixture which is is effectively roll millable and compression moldable, and cures into products having satisfactory solvent resistance, chemical resistance, heat resistance, and low-temperature properties. The addition of a surface treating agent as component (D) facilitates blending of a filler in a liquid low-molecular-weight polymer to form a millable rubber composition, offering advantages including a reduced time of filler blending, increased productivity, and improved physical properties, especially tensile strength, of the composition. The rubber composition can thus be applied to the application where high strength properties are required, finding a wider. variety of uses. The composition is of great industrial worth.

The method of the invention enables a liquid low-molecular-weight polymer to be blended and sheeted on a twin-roll rubber mill. A mold of special structure required for the molding of liquid fluororubber is no longer necessary, and an ordinary mold used in conventional synthetic rubber is employable. The invention lends itself to the manufacture of a variety of parts in small quantities. Additionally, the composition can be molded using conventional calender rolls for the pressure molding of rubber and extrusion molding machines. The invention is of great industrial worth in this sense too.

EXAMPLE

Examples of the invention are given below by way of illustration and not by way of limitation.

The materials used in Examples are as shown below.
Polymer (Perfluoro Compound)
  viscosity 4,400 cSt
  average molecular weight 16,500
  vinyl content 0.013 mol/100 g $$CH_2=CH-Si(CH_3)_2-C_6H_4-N(CH_3)-CO-Rf^1-CO-N(CH_3)-C_6H_4-Si(CH_3)_2-CH=CH_2$$

$$Rf^1: -(CFOCF_2)_x-(CF_2OCF)_y- \quad x+y=97$$
$$\phantom{Rf^1: -(}CF_3\phantom{OCF_2)_x-(}CF_3$$

Addition Reaction Crosslinker 1 (Precure Agent)

$$C_8F_{17}CH_2CH_2Si(OSiH)_3$$
with CH$_3$ substituents

Addition Reaction Crosslinker 2 (Precure Agent)

$$(HSiO)_2-Si(CH_3)_2-CH_2CH_2(CF_2)_6CH_2CH_2-Si(CH_3)_2-(OSiH)_2$$

Addition Reaction Crosslinker 3 (Precure Agent)

$$(HSiO)_3-Si(CH_3)_2-CH_2CH_2(CF_2)_5CH_2CH_2-Si(CH_3)_2-(OSiH)_3$$

Fluorinated Surface Treating Agent 1

$$HO(SiO)_3H$$
with CH$_2$CH$_2$CF$_3$ and CH$_3$ substituents

Fluorinated Surface Treating Agent 2

$$C_8F_{17}CH_2CH_2Si(OSiOH)_3$$
with CH$_3$ substituents

Addition Reaction Catalyst
  PL50T (platinum compound catalyst by Shin-Etsu Chemical Co., Ltd.)

Filler 1
  R972 (fumed silica treated with silicon-base surface treating agent by Nippon Aerosil K.K.)
Filler 2
  R976 (fumed silica treated with silicon-base surface treating agent by Nippon Aerosil K.K.)
Filler 3
  Radiolite F (diatomaceous earth powder by Showa Chemical K.K.)
Filler 4
  Aerosil 200 (non-treated fumed silica by Nippon Aerosil K.K.)

Addition Reaction Inhibitor
  ethynyl cyclohexanol, 50% toluene solution
Peroxide Crosslinking Agent
  C8A (2,5-dimethyl-2,5-di-t-butylperoxyhexane by Shin-Etsu Chemical Co., Ltd.)

The physical properties of fluororubber compositions were measured by the following test. A rubber composition was molded in a 75-ton rubber press mold at 150° C. for 10 minutes to form a rubber sheet of 2 mm thick, which was post cured at 200° C. for 4 hours. The sheet was measured for physical properties by the JIS rubber rating method.

Example 1

By mixing ingredients according to the following steps, a fluororubber composition having physical properties as shown in Table 1 was obtained.

Step (a): Precure

A 1-liter beaker was charged with a polymer and a crosslinking agent in a blending ratio as shown in Table 1. The contents were manually mixed for 10 minutes at room temperature using an agitating rod, a catalyst was then added, and mixing was continued for a further 15 minutes. This mixture was allowed to stand for 3 hours at room temperature, during which period the polymer gradually increased its viscosity and eventually became a gel-like polymer.

Since the amount of the crosslinking agent was small and many vinyl groups were left unreacted, this polymer was weak in strength in forming a rubber composition, could be easily cut and was fully deformable under stress.

Step (b): Filler Blending

The polymer was transferred to a 300-cc laboratory kneader where the temperature was raised to 170° C. and a filler was added in an amount as shown in Table 1.

After the filler addition, kneading was continued for one hour at the same temperature, obtaining a base compound.

Step (c): Crosslinking Agent Blending

The compound of step (b) was taken out of the kneader and wrapped around a twin-roll rubber mill where an addition reaction inhibitor and the same addition reaction crosslinking agent as used in step (a) were blended, yielding a curable fluororubber composition.

Example 2

Step (a): Precure

A pressure kneader was charged with a polymer and a crosslinking agent in a blending ratio as shown in Table 1. The contents were fully kneaded for 30 minutes at room temperature, a catalyst was then added, and kneading was continued for a further one hour. The polymer gradually increased its viscosity and eventually became a gel-like polymer.

Steps (b) and (c) were as in Example 1, yielding a fluororubber composition as in Example 1.

Examples 3–12

Fluororubber compositions were prepared by the same method as in Example 2 except that the type and amount of the crosslinking agent and filler were changed as shown in Tables and 2.

TABLE 1

|  |  | Example | | | | | |
|---|---|---|---|---|---|---|---|
|  |  | 1 | 2 | 3 | 4 | 5 | 6 |
| Step (a) | Polymer | 100 | 100 | 100 | 100 | 100 | 100 |
|  | Crosslinker 1 | 1.8 | 1.8 | — | 1.8 | 1.8 | 1.8 |
|  | Crosslinker 2 | — | — | 1.0 | — | — | — |
|  | Catalyst | 0.2 | 0.2 | 0.2 | 0.2 | 0.2 | 0.2 |
|  | H/V (1) | 0.65 | 0.65 | 0.45 | 0.65 | 0.65 | 0.65 |
| Step (b) | Filler 1 | 20 | 20 | 20 | 20 | — | 10 |
|  | Filler 2 | — | — | — | — | 20 | — |
|  | Filler 3 | — | — | — | 20 | — | — |
| Step (c) | Inhibitor | 0.4 | 0.4 | 0.4 | 0.4 | 0.4 | 0.4 |
|  | Crosslinker 1 | 1.3 | 1.3 | 6.5 | 1.3 | 1.3 | 1.3 |
|  | H/V (2) | 1.1 | 1.1 | 1.1 | 1.1 | 1.1 | 1.1 |
| Physical properties | Hardness (JIS-A) | 40 | 39 | 52 | 51 | 52 | 32 |
|  | Elongation (%) | 300 | 311 | 209 | 235 | 305 | 347 |
|  | Tensile strength (kg/cm$^2$) | 71 | 79 | 63 | 60 | 88 | 51 |
|  | Tear strength (kg/cm) | 16 | 16 | 14 | 15 | 19 | 11 |

H/V (1) = {quantity of hydrosilyl groups in crosslinker added in step (a)}/{quantity of alkenyl groups in perfluoro compound}
H/V (2) = {quantity of hydrosilyl groups in crosslinkers added in steps (a) and (b) combined}/{quantity of alkenyl groups in perfluoro compound}

TABLE 2

|  |  | Example | | | | | |
|---|---|---|---|---|---|---|---|
|  |  | 7 | 8 | 9 | 10 | 11 | 12 |
| Step (a) | Polymer | 100 | 100 | 100 | 100 | 100 | 100 |
|  | Crosslinker 1 | 1.8 | 1.8 | — | — | 0.9 | 0.9 |
|  | Crosslinker 3 | — | — | 0.6 | 0.6 | 0.3 | 0.3 |
|  | Catalyst | 0.2 | 0.2 | 0.2 | 0.2 | 0.2 | 0.2 |
|  | H/V (1) | 0.65 | 0.65 | 0.35 | 0.35 | 0.50 | 0.50 |
| Step (b) | Filler 1 | 30 | 20 | 20 | 20 | 20 | 20 |
|  | Filler 3 | — | 20 | 20 | 20 | 20 | 20 |
| Step (c) | Inhibitor | 0.4 | 0.4 | 0.4 | 0.4 | 0.4 | 0.4 |
|  | Crosslinker 1 | 1.3 | — | 2.1 | — | 1.7 | — |
|  | Crosslinker 3 | — | 0.8 | — | 1.3 | — | 1.0 |
|  | H/V (2) | 1.1 | 1.1 | 1.1 | 1.1 | 1.1 | 1.1 |
| Physical properties | Hardness (JIS-A) | 62 | 62 | 65 | 74 | 65 | 74 |
|  | Elongation (%) | 165 | 154 | 114 | 74 | 144 | 107 |
|  | Tensile strength (kg/cm$^2$) | 73 | 59 | 63 | 69 | 76 | 81 |
|  | Tear strength (kg/cm) | 18 | 10 | 17 | 9 | 15 | 10 |

H/V (1) = {quantity of hydrosilyl groups in crosslinker added in step (a)}/{quantity of alkenyl groups in perfluoro compound}
H/V (2) = {quantity of hydrosilyl groups in crosslinkers added in steps (a) and (b) combined}/{quantity of alkenyl groups in perfluoro compound}

Comparative Example 1

An attempt was made to prepare a fluororubber composition by the same method as in Example 2 except that the amount of the crosslinker added in the precure step was reduced as shown in Table 3. The polymer became somewhat thickened, but remained flowable. The composition resulting from step (b) could not be wrapped around the roll.

Comparative Example 2

As opposed to Comparative Example 1, the amount of the crosslinker added in the precure step was increased as shown in Table 3. The polymer became a fully cured rubber, preventing the addition of filler in step (b). It is thus proven that unless the precure step is carried out by blending an appropriate crosslinker, the polymer does not form a millable rubber composition which is workable on a twin-roll rubber mill.

Comparative Example 3

As shown in Table 3, the polymer was loaded with a large amount of the filler without the precure step. Roll milling was possible, but the resulting composition lacked rubber elasticity, indicating to be a poor rubber composition. It is thus proven that the precure step is requisite for forming a rubber composition from the low-viscosity polymer.

TABLE 3

|  |  | Comparative Example | | |
|---|---|---|---|---|
|  |  | 1 | 2 | 3 |
| Step (a) | Polymer | 100 | 100 | 100 |
|  | Crosslinker 1 | 0.1 | 3.8 | — |
|  | Catalyst | 0.2 | 0.2 | 0.2 |
|  | H/V (1) | 0.03 | 1.00 | — |
| Step (b) | Filler 1 | 20 | filler | — |
|  | Filler 3 | — | blending disabled | 120 |
| Step (c) | Inhibitor | roll working disabled | — | 0.4 |
|  | Crosslinker 1 | | — | 4.1 |
|  | H/V (2) | — | — | 1.1 |
| Physical properties | Hardness (JIS-A) | — | — | 93 |
|  | Elongation (%) | — | — | 15 |
|  | Tensile strength (kg/cm$^2$) | — | — | 32 |
|  | Tear strength (kg/cm) | — | — | 9 |

H/V (1) = {quantity of hydrosilyl groups in crosslinker added in step (a)}/{quantity of alkenyl groups in perfluoro compound}
H/V (2) = {quantity of hydrosilyl groups in crosslinkers added in steps (a) and (b) combined}/{quantity of alkenyl groups in perfluoro compound}

Example 13

By mixing ingredients according to the following steps, a fluororubber composition having physical properties as shown in Table 4 was obtained.

Step (a): Precure

A 1-liter beaker was charged with a polymer and a crosslinking agent in a blending ratio as shown in Table 4. The contents were manually mixed for 10 minutes at room temperature using an agitating rod, a catalyst was then added, and mixing was continued for a further 15 minutes. This mixture was allowed to stand for 3 hours at room temperature, during which period the polymer gradually increased its viscosity and eventually became a gel-like polymer.

Since the amount of the crosslinking agent was small and many vinyl groups were left unreacted, this polymer was weak in strength in forming a rubber composition, could be easily cut and was fully deformable under stress.

Step (b): Filler Blending

The polymer was transferred to a 300-cc laboratory kneader where the temperature was raised to 170° C. and a filler was added in an amount as shown in Table 4.

After the filler addition, kneading was continued for one hour at the same temperature, obtaining a base compound.

Step (c): Crosslinking Agent Blending

The compound of step (b) was taken out of the kneader and wrapped around a twin-roll rubber mill where a peroxide was blended, yielding a curable fluororubber composition.

Example 14

Step (a): Precure

A pressure kneader was charged with a polymer and a crosslinking agent in a blending ratio as shown in Table 4. The contents were fully kneaded for 30 minutes at room temperature, a catalyst was then added, and kneading was continued for a further one hour. The polymer gradually increased its viscosity and eventually became a gel-like polymer.

Steps (b) and (c) were as in Example 13, yielding a fluororubber composition as in Example 13.

Examples 15–18

Fluororubber compositions were prepared by the same method as in Example 14 except that the type and amount of the crosslinking agent and filler were changed as shown in Table 4. All these compositions gave cured products having satisfactory rubber elasticity while their physical properties are shown in Table 4.

TABLE 4

| | | Example | | | | | |
|---|---|---|---|---|---|---|---|
| | | 13 | 14 | 15 | 16 | 17 | 18 |
| Step (a) | Polymer | 100 | 100 | 100 | 100 | 100 | 100 |
| | Crosslinker 1 | 1.8 | 1.8 | 1.8 | 1.8 | — | 0.9 |
| | Crosslinker 3 | — | — | — | — | 0.6 | 0.3 |
| | Catalyst | 0.2 | 0.2 | 0.2 | 0.2 | 0.2 | 0.2 |
| | H/V | 0.65 | 0.65 | 0.65 | 0.65 | 0.35 | 0.50 |
| Step (b) | Filler 1 | 25 | 20 | 20 | 20 | 20 | 20 |
| | Filler 3 | — | 20 | 20 | 20 | 20 | 20 |
| Step (c) | Peroxide | 1.0 | 1.0 | 1.5 | 2.0 | 1.5 | 1.5 |
| Physical properties | Hardness (JIS-A) | 37 | 65 | 62 | 76 | 65 | 63 |
| | Elongation (%) | 328 | 134 | 146 | 137 | 114 | 138 |
| | Tensile strength (kg/cm$^2$) | 68 | 44 | 42 | 40 | 43 | 46 |
| | Tear strength (kg/cm) | 12 | 10 | 12 | 11 | 18 | 12 |

H/V = {quantity of hydrosilyl groups in crosslinker added in step (a)}/{quantity of alkenyl groups in perfluoro compound}

Comparative Example 4

An attempt was made to prepare a fluororubber composition by the same method as in Example 13 except that the amount of the crosslinker added in the precure step was reduced as shown in Table 5. The polymer became somewhat thickened, but remained flowable. The composition resulting from step (b) could not be wrapped around the roll.

Comparative Example 5

As opposed to Comparative Example 4, the amount of the crosslinker added in the precure step was increased as shown in Table 5. The polymer became a fully cured rubber, preventing the addition of filler in step (b). It is thus proven that unless the precure step is carried out by blending an appropriate crosslinker, the polymer does not form a millable rubber composition which is workable on a twin-roll rubber mill.

Comparative Example 6

As shown in Table 5, the polymer was loaded with a large amount of the filler without the precure step. Roll milling was possible, but the resulting composition lacked rubber elasticity, indicating to be a poor rubber composition. It is thus proven that the precure step is requisite for forming a rubber composition from the low-viscosity polymer.

TABLE 5

| | Comparative Example | 4 | 5 | 6 |
|---|---|---|---|---|
| Step (a) | Polymer | 100 | 100 | 100 |
| | Crosslinker 1 | 0.1 | 3.8 | — |
| | Catalyst | 0.2 | 0.2 | 0.2 |
| | H/V | 0.03 | 1.00 | — |
| Step (b) | Filler 1 | 20 | filler blending disabled | — |
| | Filler 3 | — | | 120 |
| Step (c) | Peroxide | Roll working disabled | — | 1.5 |
| Physical properties | Hardness (JIS-A) | — | — | 90 |
| | Elongation (%) | — | — | 38 |
| | Tensile strength (kg/cm$^2$) | — | — | 21 |
| | Tear strength (kg/cm) | — | — | 7 |

H/V = {quantity of hydrosilyl groups in crosslinker added in step (a)}/{quantity of alkenyl groups in perfluoro compound}

Example 19

A fluororubber composition was prepared as in Example 1 except that a surface treating agent was further blended as shown in Table 6. The physical properties of the composition are shown in Table 6. It is noted that the surface treating agent was blended in step (b) along with the filler.

Examples 20–24

Fluororubber compositions were prepared as in Example 19 except that the type and amount of the filler and surface treating agent were changed as shown in Table 6. All the compositions cured into rubber sheets having satisfactory physical properties as typified by a tensile strength in excess of 100 kg/cm² as shown in Table 6.

Example 25

A fluororubber composition was prepared by following the same steps (a) and (b) as in Example 19 and in step (c), adding a peroxide crosslinker instead of the addition reaction inhibitor and addition reaction crosslinker. The formation is shown in Table 7 together with the physical properties of the composition.

TABLE 6

|  |  | Example | | | | | |
|---|---|---|---|---|---|---|---|
|  |  | 19 | 20 | 21 | 22 | 23 | 24 |
| Step (a) | Polymer | 100 | 100 | 100 | 100 | 100 | 100 |
|  | Crosslinker 1 | 1.8 | 1.8 | 1.8 | 1.8 | 1.8 | 1.8 |
|  | Catalyst | 0.2 | 0.2 | 0.2 | 0.2 | 0.2 | 0.2 |
|  | H/V (1) | 0.65 | 0.65 | 0.65 | 0.65 | 0.65 | 0.65 |
| Step (b) | Surface treating agent 1 | 1 | 3 | 7 | 10 | — | — |
|  | Surface treating agent 2 | — | — | — | — | 1 | 3 |
|  | Filler 1 | 20 | — | — | — | 20 | — |
|  | Filler 2 | — | 20 | — | — | — | 20 |
|  | Filler 4 | — | — | 20 | 35 | — | — |
| Step (c) | Inhibitor | 0.4 | 0.4 | 0.4 | 0.4 | 0.4 | 0.4 |
|  | Crosslinker 1 | 1.3 | 1.3 | 1.3 | 1.3 | 1.3 | 1.3 |
|  | H/V (2) | 1.1 | 1.1 | 1.1 | 1.1 | 1.1 | 1.1 |
| Physical properties | Hardness (JIS-A) | 48 | 48 | 48 | 74 | 47 | 43 |
|  | Elongation (%) | 396 | 481 | 526 | 350 | 429 | 525 |
|  | Tensile strength (kg/cm²) | 101 | 119 | 131 | 114 | 114 | 118 |
|  | Tear strength (kg/cm) | 15 | 24 | 24 | 26 | 17 | 26 |

H/V (1) = {quantity of hydrosilyl groups in crosslinker added in step (a)}/{quantity of alkenyl groups in perfluoro compound}
H/V (2) = {quantity of hydrosilyl groups in crosslinkers added in steps (a) and (b) combined}/{quantity of alkenyl groups in perfluoro compound}

TABLE 7

|  | Example | 25 |
|---|---|---|
| Step (a) | Polymer | 100 |
|  | Crosslinker 1 | 1.8 |
|  | Catalyst | 0.2 |
|  | H/V (1) | 0.65 |
| Step (b) | Surface treating agent 1 | 10 |
|  | Filler 4 | 35 |
| Step (c) | Peroxide | 1 |
| Physical properties | Hardness (JIS-A) | 73 |
|  | Elongation (%) | 293 |
|  | Tensile strength (kg/cm²) | 90 |
|  | Tear strength (kg/cm) | 20 |

H/V (1) = {quantity of hydrosilyl groups in crosslinker added in step (a)}/{quantity of alkenyl groups in perfluoro compound}

Japanese Patent Application No. 10-191038 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A crosslinkable millable fluororubber composition comprising (A) 100 parts by weight of a non-flowing gel-like polymer comprising a fluorinated compound having at least two alkenyl groups in the molecule and a divalent perfluoroalkylene or divalent perfluoropolyether structure in the backbone and a compound having at least three hydrosilyl groups in the molecule and capable of addition reaction with alkenyl groups, wherein the hydrosilyl-bearing compound is added to some of the alkenyl groups in the fluorinated compound by addition reaction, (B) 1 to 100 parts by weight of a reinforcing filler, (C) a sufficient amount to cure component (A) of a crosslinking agent having at least two hydrosilyl groups in the molecule and capable of addition reaction or a peroxide crosslinking agent, and (D) 0.01 to 30 parts by weight of a surface treating agent having at least one fluoroalkyl group and silanol groups in the molecule.

2. A composition according to claim 1 wherein the surface treating agent (D) is a compound of the following formula (10) or (11):

(10)

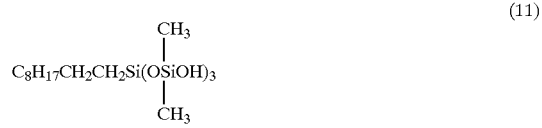

(11)

wherein n is an integer of 1 to 10.

3. A method for preparing a millable fluororubber composition comprising the steps of:

(a) adding a compound having at least three hydrosilyl groups in the molecule and capable of addition reaction with alkenyl groups to a fluorinated compound having at least two alkenyl groups in the molecule and a divalent perfluoroalkylene or divalent perfluoropolyether structure in the backbone in such amounts that the molar ratio of hydrosilyl groups in said hydrosilyl-containing compound to alkenyl groups in said fluorinated compound range from 0.1/1 to 0.99/1, and effecting addition reaction to form a non-flowing gel-like polymer, (b) adding a reinforcing filler to the polymer of step (a) in an amount of 1 to 100 parts by weight per 100 parts by weight of said fluorinated compound, to form a base compound, and (c) adding to the base compound of step (b), a crosslinking agent having at least two hydrosilyl groups in the molecule and capable of addition reaction or a peroxide crosslinking agent in a sufficient amount to react with alkenyl group in the polymer.

4. A method according to claim 3, wherein step (b) further includes adding a surface treating agent having at least one fluoroalkyl group and silanol groups in the molecule to the polymer in an amount of 0.01 to 30 parts by weight per 100 parts by weight of said fluorinated compound.

5. A method according to claim 3, wherein said crosslinking agent has at least three hydrosilyl groups per molecule.

6. A method according to claim 3, wherein the ratio of (a) the sum of the hydrosilyl group in said hydrosilyl-containing compound and the hydrosilyl groups in the crosslinking agent to (b) the number of alkenyl groups in the fluorinated compound, is 0.5–5.

7. A method according to claim 3, wherein the crosslinking agent is a peroxide crosslinking agent, which is added in an amount of 0.1–5 parts by weight per 100 parts by weight of said polymer.

\* \* \* \* \*